April 5, 1960

W. H. FISHER 2,931,207

ACCELERATOR PEDAL LOCK

Filed Aug. 27, 1958

INVENTOR
WILLIAM H. FISHER

BY Kimmel & Crowell

ATTORNEYS

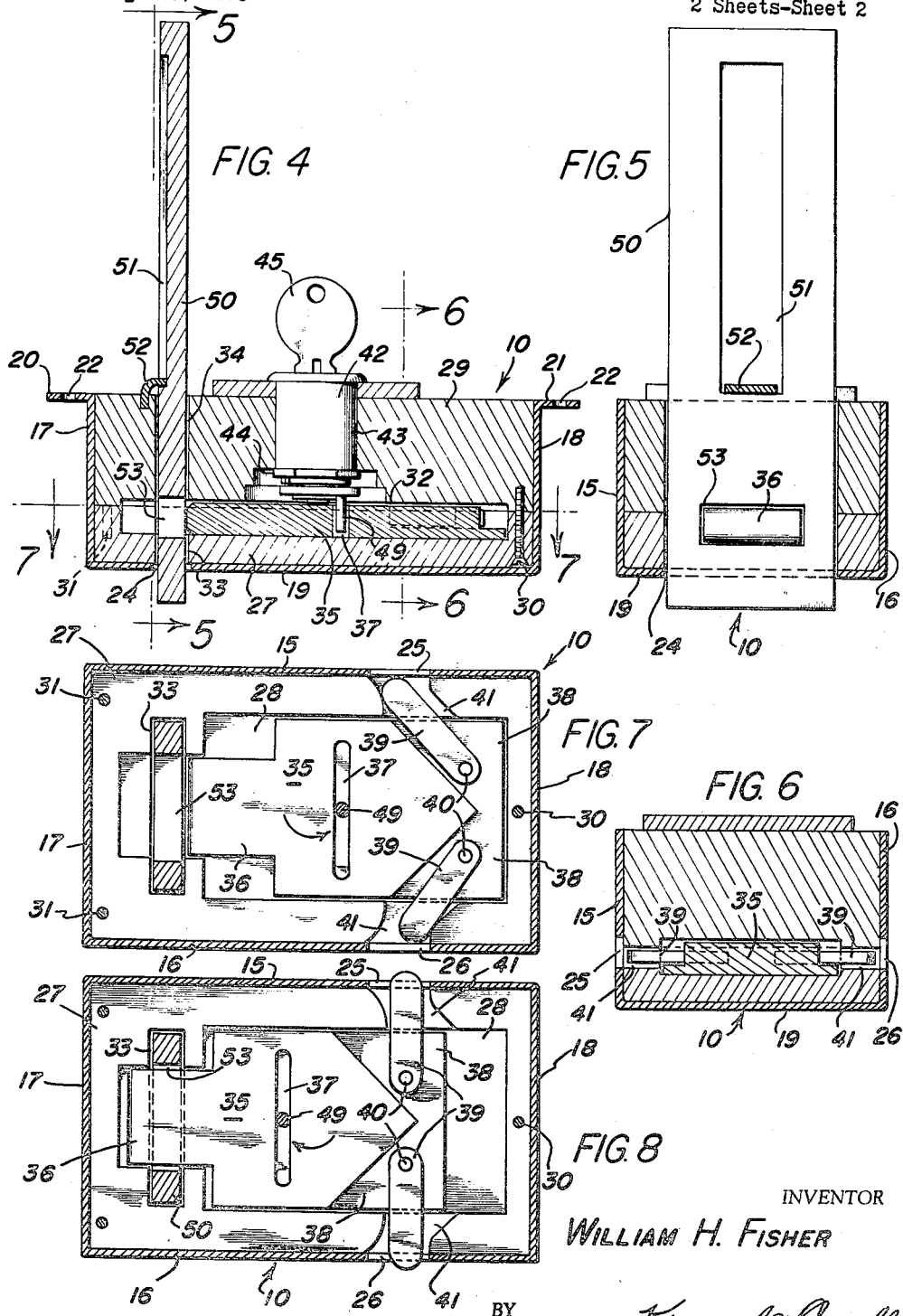

United States Patent Office 2,931,207
Patented Apr. 5, 1960

2,931,207
ACCELERATOR PEDAL LOCK
William Henry Fisher, Madison, Wis.
Application August 27, 1958, Serial No. 757,600
3 Claims. (Cl. 70—181)

The present invention relates to accelerator pedal locks, and particularly to locks provided for preventing the operation of the accelerator pedal of a motor vehicle.

The primary object of the invention is to provide an accelerator pedal lock which is arranged in underlying relation to the accelerator pedal so as to be out of the way in normal use.

Another object of the invention is to provide a lock of the class described above in which it is supported by key controlled means.

A further object of the invention is to provide an accelerator pedal lock of the class described above which will permit the normal operation of the accelerator pedal when in unlocked condition.

A still further object of the invention is to provide an accelerator pedal lock of the class described above which is inexpensive to manufacture, simple to attach, and which is completely effective in locking the accelerator pedal when desired.

Other objects and advantages will become apparent in the following specification when considered in the light of the attached drawings, in which:

Figure 4 is a vertical sectional view taken along the line 4—4 of Figure 3, looking in the direction of the arrows.

Figure 5 is a vertical sectional view taken along the line 5—5 of Figure 4, looking in the direction of the arrows.

Figure 6 is a vertical sectional view taken along the line 6—6 of Figure 4, looking in the direction of the arrows.

Figure 7 is a horizontal sectional view taken along the line 7—7 of Figure 4, looking in the direction of the arrows.

Figure 8 is a view similar to Figure 7 showing the locking bolt in locking position.

Figure 1:
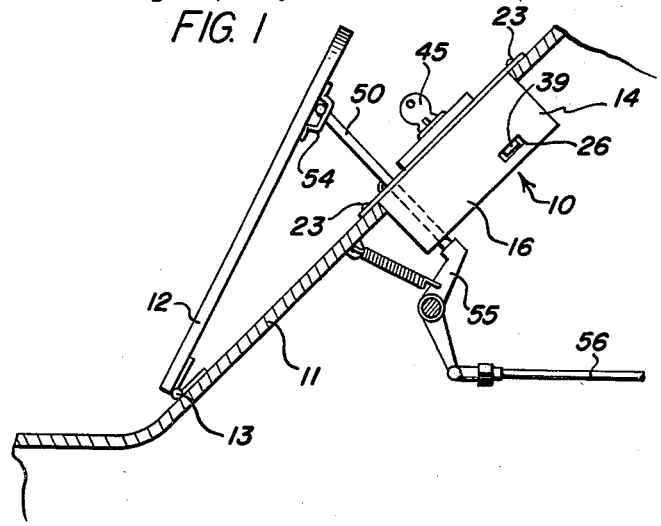
Figure 1 is a side elevation of the invention shown attached to the floor board of a motor vehicle with the floor board being shown in vertical section.
Figure 2:
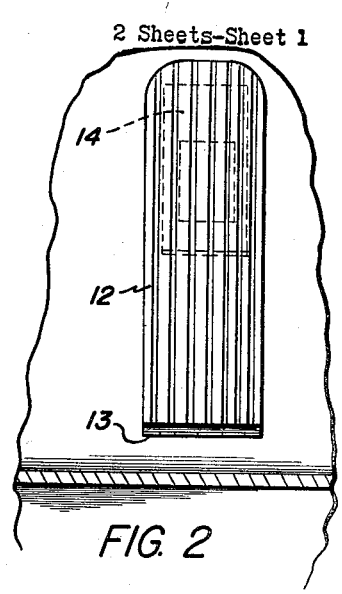
Figure 2 is a front elevation of the invention.
Figure 3:
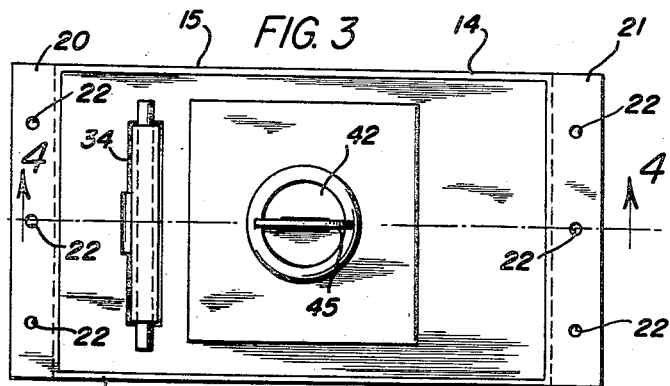
Figure 3 is a top plan view of the invention shown removed from the floor board.
Figure 9:
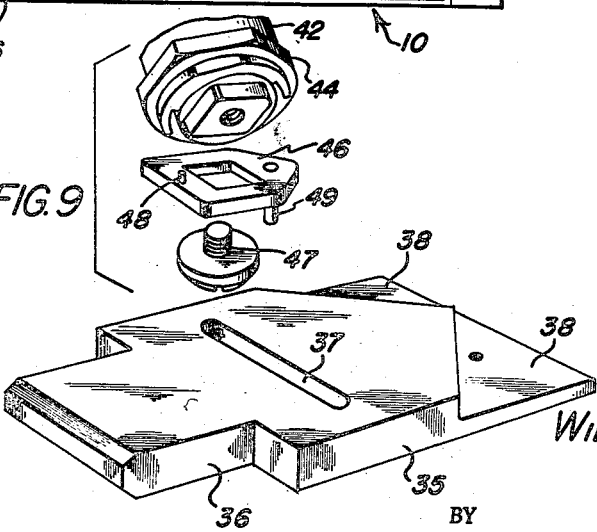
Figure 9 is an exploded perspective view of the locking bolt and the drive mechanism therefor.

Referring now to the drawings in detail wherein like reference characters indicate like parts throughout the several figures, the reference numeral 10 indicates generally an accelerator pedal lock constructed in accordance with the invention and attached to the floor board 11 of a motor vehicle.

An accelerator pedal 12 of conventional design is secured to the floor board 11 by a hinge 13 and is arranged to pivot thereabout to a position substantially parallel to the floor board 11 when pressed by the foot of the driver.

The lock 10 includes a housing 14 of generally rectangular shape and having spaced apart parallel side walls 15, 16 connected by spaced apart parallel end walls 17, 18. A bottom wall 19 extends between and connects the side walls 15, 16 and the end walls 17, 18.

An integral flange 20 is secured to the upper edge of the end wall 17 extending parallel to the bottom wall 19. An integral flange 21 is secured to the upper edge of the end wall 18 extending parallel to the bottom wall 19. The flanges 20, 21 extend outwardly and are provided with a plurality of apertures 22 through which securing elements 23 may extend to secure the housing 14 to the floor board 11.

The bottom wall 19 is provided with a generally rectangular elongated transversely extending slot 24 arranged adjacent to and parallel the end wall 17. The side walls 15, 16 are provided with longitudinally elongated generally rectangular slots 25, 26, respectively, parallel to the bottom wall 19 and spaced upwardly therefrom.

A block 27 of generally rectangular form is supported in the housing 14 and is provided with an elongated recess 28, for reasons to be assigned. A second generally rectangular block 29 has the same lateral and longitudinal dimensions as the block 27 and is secured thereto by a bolt 30, as seen in Figures 4 and 7.

Guide pins 31 are secured to the end of the block 29 opposite the bolt 30 and extend into openings in the block 27 to maintain the alignment of the block 27 with the block 29. The block 29 is provided with an elongated recess 32 having the same shape as the recess 28 overlying the recess 28. The blocks 27, 29 are provided with a generally rectangular opening 33, 34, respectively, arranged to overlie and align with the opening 24 in the bottom wall 19.

A relatively flat bolt 35 is positioned for longitudinal sliding movement in the recesses 28, 32 and is provided with a generally rectangular tongue 36 on one end thereof. The bolt 35 has a transversely extending slot 37 formed therein intermediate the opposite ends thereof. At the end thereof opposite the tongue 36, the bolt 35 is cut away at 38 at the upper opposite corners and a pair of swinging bolts 39 are pivotally secured thereon by pivot pins 40.

The block 27 is provided with a pair of oppositely outwardly extending recesses 41 communicating with the recess 28 and with the slots 25, 26 so as to cam the swinging bolts 39 outwardly through the slots 25, 26 on sliding movement of the bolt 35 toward the opening 33.

A tumbler lock 42 extends through a bore 43 in the block 29 and is secured therein by a nut 44. The tumbler lock 42 is operated by a key 45, and on rotation of the key 45, a cam plate 46 secured to the lower end of the tumbler lock 42 by a bolt 47 is caused to rotate through 180 degrees. The cam plate 46 has a stop 48 formed thereon to prevent movement of the cam plate 46 beyond fixed limits.

A wooden pin 49 is fixedly secured to the cam plate 46 and extends downwardly therefrom into the slot 37 so that rotational movement of the key 45 will be effective to cam the bolt 35 toward the openings 33, 34 in the blocks 27, 29. The wooden pin 49 serves as a safety device, and should the lock 42 be jammed or forced, the wooden pin 49 will break off preventing the moving of the bolt 35 in an unlocking direction. The pin may also be of suitable metal.

A generally flat bar 50 is of substantially rectangular shape and is mounted for vertical sliding movement in the openings 33, 34 and the opening 24. The bar 50 has an elongated vertical groove 51 formed therein and a hook shaped guide member 52 engages therein to retain the bar 50 in the openings 33, 34, 24. The bar 50 adjacent the lower end thereof is provided with a generally rectangular transversely elongated opening 53 which is adapted to be aligned with the recesses 28, 32 so that the tongue 36 can engage therein on horizontal movement of the bolt 35.

The upper end of the bar 50 is secured to the accelerator pedal 12 by a bracket 54 so that the bar 50 moves with the accelerator pedal 12. The lower end of the bar 50 engages against a bell crank 55 which is spring urged toward the bar 50 and is connected by a link 56 to the carbureter of the motor vehicle (not shown).

In the use and operation of the invention, the accelerator pedal 12 is used in the normal manner with the bar 50 sliding through the openings 33, 34, 24 to operate the bell crank 55 and the link 56. When it is desired to lock the accelerator pedal 12 during absence of the owner from the motor vehicle, the key 45 is inserted in the tumbler lock 42, and with the bar 50 in the position so that the openings 53 therein aligns with the tongue 36, the tumbler lock 42 is turned with the key 45 so that the pin 49 moving in the slot 37 moves the bolt 35 so that the tongue 36 engages in the opening 53 in the bar 50 and simultaneously the swing bolts 39 engage through the slots 25, 26 in the housing 14 to securely lock the bar 50 to the housing 14 while simultaneously locking the blocks 27, 29 in the housing 14 so that the device can not be removed from the floor board 11 or from the bar 50 without the use of the key 45.

The engagement of the swing bolts 39 in the slots 25, 26 of the housing 14 provides a locking engagement between the mechanism and the surrounding housing 14 such that complete destruction of the housing 14 would be necessary in order to make it possible to move the carburetor linkage in the absence of the key 45. When the bolts 39 are retracted the blocks 27, 29 may be removed from the housing 14 for replacement or repair.

The key 45 is normally removed from the lock 42 during the operation of the motor vehicle when the lock 42 is in unlocked position.

Having thus described the preferred embodiments of the invention, it should be understood that numerous structural modifications and adaptations may be resorted to without departing from the scope of the appended claims.

What is claimed is:

1. An accelerator pedal lock comprising an open top housing adapted to be secured to the floor board of a motor vehicle, a pair of superposed lock blocks mounted in said housing and having a generally rectangular opening extending perpendicularly therethrough in aligned relation to an opening in said housing opposite the open top thereof, a bar mounted in said opening in said lock blocks and said housing for sliding movement therethrough, said bar having a transversely extending slot formed therein, said lock blocks having a recess formed therebetween with said recess extending generally perpendicularly to said bar and intersecting the opening in said lock blocks, a lock block slidably mounted in said recess, a tongue formed on one end of said lock block to removably project through said slot in said bar locking said bar against movement in said opening, a pair of swingable bolts pivoted to said lock bolt, said housing having a pair of keeper slots formed in opposite sides thereof, cam means on said lock blocks for camming said swinging bolts into position projecting through said keeper slots on sliding movement of said lock bolt whereby said lock blocks are releasably locked in said housing while simultaneously said bar is releasably locked to said lock blocks, and means on one of said lock blocks for moving said lock bolt in said recess.

2. A device as claimed in claim 1 wherein means are provided on one of said lock blocks for retaining said bar in sliding position therein.

3. A device as claimed in claim 1 wherein the means moving said lock bolt in said recess includes key controlled tumbler means connected to said lock bolt by a wooden drive pin.

References Cited in the file of this patent

UNITED STATES PATENTS

| | | |
|---|---|---|
| 812,905 | Voight | Feb. 20, 1906 |
| 1,635,797 | Mirande | July 12, 1927 |
| 1,814,646 | Terrill | July 14, 1931 |
| 1,974,198 | Spero | Sept. 18, 1934 |
| 2,471,293 | Truesdell | May 24, 1949 |
| 2,747,396 | Gamby | May 29, 1956 |